O. EDWARDS.

Skates.

No. 6,410.

Reissued May 4, 1875.

*Attest:*

C. H. Trilly
J. Mason Sozzler

*Inventor:*

Oliver Edwards
By N. Cranford atty.

THE GRAPHIC CO. PHOTO-LITH. 39 & 41 PARK PLACE, N.Y.

UNITED STATES PATENT OFFICE.

OLIVER EDWARDS, OF FLORENCE, MASSACHUSETTS.

IMPROVEMENT IN SKATES.

Specification forming part of Letters Patent No. 154,176, dated August 18, 1874; reissue No. 6,410, dated May 4, 1875; application filed January 15, 1875.

*To all whom it may concern:*

Be it known that I, OLIVER EDWARDS, of Florence, in the county of Hampshire, in the State of Massachusetts, have made certain Improvement in Skates, of which the following is the specification:

The object of this invention is to produce a cheap, durable, and simple skate; and it consists in the construction of the same, as will be fully hereinafter described.

Figure 1:
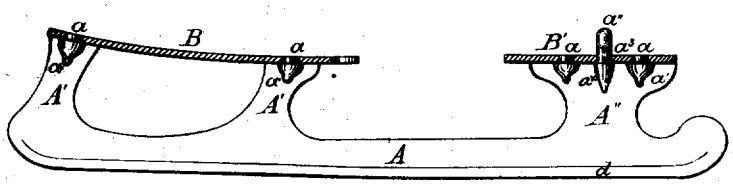
Figure 2:
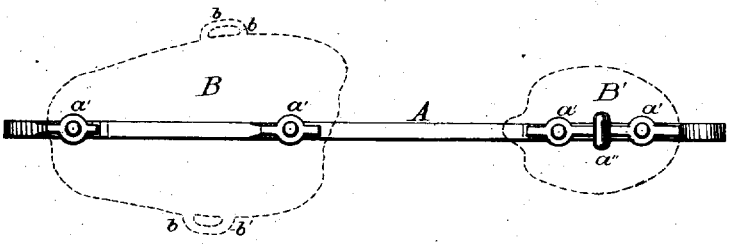

In the drawings, Figure 1 represents a side view of the skate with the heel and foot plates in section; Fig. 2, a top view of the same; and Fig. 3 a rear upright sectional view through the button or stud that attaches the heel-plate to the heel of the boot or shoe.

A represents the runner of the skate of the usual form, with the risers A′, A′, and A″, with the rivets to secure the foot and heel plates to the runner, and the button or stud to fasten the heel of the skate to the heel of the boot, all in the same piece of metal. A′ A′ are the forward and center risers. A″ is the rear or riser that supports the heel-plate. *a a a a* are rivets projecting upwardly from the top of the risers, and by which the foot and heel plates are firmly secured to the risers of the runner. *a′ a′ a′ a′* are bases to the rivets *a*, and extend concentrically from the center of the rivets on each side of and at the top of the risers, which give lateral support to the foot and heel plates when they are riveted down upon the risers. *a″* is the button or stud, which, like the rivets *a*, has a base, $a^{x}$, on each side of the riser, and passes through the heel-plate, above which is a neck, $a^{3}$, to receive the plate fast to the heel of the boot, while the button on the top is of greater diameter transversely with the riser than parallel with the runner, the neck $a^{3}$ being round. At the lower edge of the runner, and on either side, are projections *d d*, which give to the face of the runner a wide tread, and a thinner and lighter body; hence a lighter skate is produced with the requisite strength.

The runner A, with the risers, rivets, button, and their bases, is made by casting in molds from any suitable metal of which the runners of skates are cast, or the runners may be cut or stamped from metal plates, and then formed in suitable dies to the condition described, and all in one piece of metal.

Figure 3:
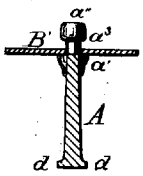

B is the toe or ball of the foot plate or rest, riveted fast to risers A′ by the rivets *a*. B′ is the heel-plate rest, riveted fast to riser A″ by rivets *a*, with a hole to allow the button *a″* to pass through it, as seen in Figs. 1 and 3. *b b* are projections on either side of plate B, and have loop-holes *b′* thereon to receive the proper straps to fasten the foot to the skate.

By this construction a skate is made, and has but three pieces of metal in it, and by having less pieces and fewer joints the strength and durability of a skate is increased, while the liability to break or get out of order is decreased, and cost of production lessened.

What I claim as new is—

1. The skate-runner A, with its risers A′ and A″, rivets *a*, button or stud *a″*, and their enlarged bases *a′*, in one piece of metal, in the manner and for the purpose described.

2. The skate-runner A, having rivets *a*, stud *a″*, with their enlarged bases *a′*, in combination with the plates B and B′, substantially as and for the purposes described.

3. A skate-runner, A, with its risers A′ and A″, rivets *a a a a*, and their enlarged bases *a′*, in one piece of metal, as described.

4. A skate-runner, A, with its risers A′ and A″, rivets *a a a a*, their enlarged bases *a′*, and projections *d d*, in one piece of metal, as described.

5. A skate-runner, A, with its risers A′ and A″, rivets *a a a a*, button *a″*, and their enlarged bases *a′* and projections *d d* in one piece of metal, substantially as described.

OLIVER EDWARDS.

Witnesses:

CALVIN PORTER,

THOMAS PORTER.